(12) United States Patent
Hussain

(10) Patent No.: US 7,322,434 B1
(45) Date of Patent: Jan. 29, 2008

(54) COLLAPSIBLE GOLF SCOOTER CART HAVING FOLD OUT BALANCE WHEELS

(76) Inventor: Alex S Hussain, 1925 - 25'th St. SW., #202, Calgary, AB (CA) T3E 1W8

( * ) Notice: Subject to any disclaimer, the term of this patent is extended or adjusted under 35 U.S.C. 154(b) by 147 days.

(21) Appl. No.: 11/161,143

(22) Filed: Jul. 25, 2005

(51) Int. Cl.
B62K 15/00 (2006.01)

(52) U.S. Cl. ............ 180/180; 280/87.041; 280/DIG. 5; 224/274

(58) Field of Classification Search ............ 280/87.01, 280/87.041, 32.5, DIG. 5, 763.1, 767; 180/180, 180/181; D34/15; 224/274
See application file for complete search history.

(56) References Cited

U.S. PATENT DOCUMENTS

| | | | | |
|---|---|---|---|---|
| 4,848,504 A | * | 7/1989 | Olson ...................... | 180/19.1 |
| 4,974,693 A | * | 12/1990 | Nakai et al. ............... | 180/19.3 |
| D330,630 S | * | 11/1992 | Loden ......................... | D3/10 |
| 5,169,165 A | * | 12/1992 | Oates ....................... | 280/87.03 |
| 5,265,695 A | * | 11/1993 | Piazzi ....................... | 180/208 |
| 5,328,193 A | * | 7/1994 | Shiew .................... | 280/87.041 |
| 5,363,934 A | * | 11/1994 | Edmund et al. ............. | 180/6.5 |
| 5,899,284 A | * | 5/1999 | Reimers et al. ............... | 180/11 |
| 6,390,216 B1 | * | 5/2002 | Sueshige et al. ........... | 180/65.5 |
| 7,021,408 B2 | * | 4/2006 | Fricker ...................... | 180/19.1 |

* cited by examiner

Primary Examiner—Christopher P. Ellis
Assistant Examiner—Brian Swenson
(74) Attorney, Agent, or Firm—R. F. Gallagher

(57) ABSTRACT

A stable and lightweight golf cart comprises: an elongate frame has a front fork having a lower forked portion attached to a front wheel, a central portion pivotably attached to a front portion of the elongate frame, and a top portion carrying a steering member; a drive means and rear driven wheel attached to a rear portion of the frame; and, two laterally extended balance wheels attached to and carried by a central portion of the frame. In use the balance wheels are positioned outwardly thereby maintaining the golf cart in an upright position. In a preferred aspect of the invention the golf cart frame comprises a platform and each of the balance wheels are attached to one end portion of an arm having an opposite end portion which is hingably attached to a rear of the central portion of the platform so that the balance wheels may swing laterally outward from the platform to an in-use position. A central portion of the golf cart platform carries an upright member which in turn carries a golf bag support attachment, and possibly a seat.

10 Claims, 1 Drawing Sheet

COLLAPSIBLE GOLF SCOOTER CART HAVING FOLD OUT BALANCE WHEELS

FIELD OF THE INVENTION

Figure 1:
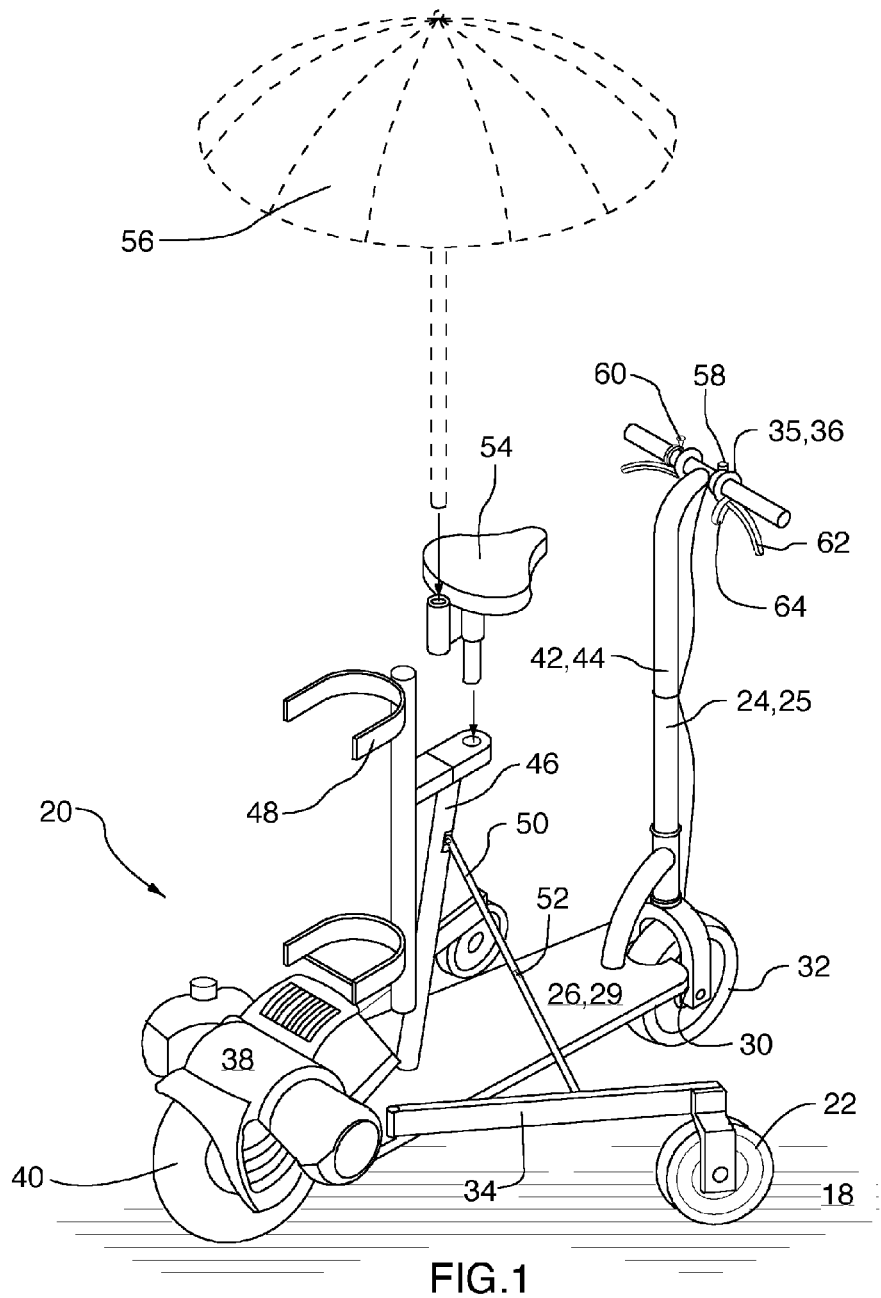

This invention relates to golf carts. More particularly this invention relates to a lightweight collapsible scooter having fold out balance wheels. The scooter is configured to support a golf bag as well as an individual driver.

BACKGROUND OF THE INVENTION

The conventional four wheel golf cart facilitates transport of a golfing party from a completed hole to the next tee off. Only if the golfing party all together as a group moves from one player's ball to the next player's ball does the traditional golfing cart accommodate widely dispersed balls. For serious golfers this time delay is a frustration which is usually not worth the time expenditure. Another problem with the traditional golf cart is that it is generally too large to transport to the golf course in the trunk of an automobile. It must be rented. Consequently many individuals have proposed designs for smaller individual golf carts. Many of these designs employ three wheels. The general problem with these three wheeled carts is that they are not sufficiently lightweight and collapsible to facilitate convenient transport in the trunk of an automobile. Other designs for individual golf carts employ only two wheels. The general problem with these two wheel carts is that they do not remain upright when they are stopped. Golf paraphernalia fall out of them when they are stopped and it difficult for a user to upright the golf cart and then organize the dropped paraphernalia while holding the cart upright. What is needed is a golf cart which has the collapsibility of a two wheeled design and the upright stability of a three wheeled design.

OBJECTS OF THE INVENTION

It is an object of this invention to disclose a single person golf cart which has the stability of a three wheeled design and the collapsibility of a two wheeled design. It is an object of this invention to disclose a design for a two wheeled golf cart (which additionally has two balance wheels) which is inherently lightweight and stable. A golf cart which will maintain an upright posture while it is stopped and which will not damage fairway grass. It is yet a further object of this invention to disclose a golf cart which is sufficiently collapsible to enable it to be conveniently transported in the trunk of a golfer's vehicle.

One aspect of this invention provides for a stable and lightweight collapsible golf cart comprising: an elongate frame having a front, rear, and central portion, a front fork having a lower forked portion attached to an axle of a front wheel, a central portion pivotably attached to a front portion of the elongate frame, and a top portion carrying a steering member; a drive means and rear driven wheel attached to a rear portion of the frame; and, two laterally extended balance wheels attached to and carried by a central portion of the frame. In use the balance wheels are positioned outwardly from the central portion of the frame thereby maintaining the golf cart in an upright position.

In a preferred aspect of the invention the golf cart frame comprises a platform and each of the balance wheels are attached to one end portion of an arm having an opposite end portion which is hingably attached to a rear of the central portion of the platform so that the balance wheels may swing laterally outward from the platform from a storage position to an in-use position. A central portion of the golf cart platform carries an upright member which in turn carries a golf bag support attachment, and possibly a seat.

Various other objects, advantages and features of this invention will become apparent to those skilled in the art from the following description in conjunction with the accompanying drawings.

FIGURES OF THE INVENTION

FIG. 1 is a perspective view of a collapsible scooter golf cart having fold out balance wheels and a hingably collapsible front fork.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a collapsible scooter golf cart 20 having fold out balance wheels 22 and a hingably collapsible front fork 24. The stable and lightweight collapsible golf cart 20 comprises: an elongate frame 26 having a front, rear, and central portion, a front fork 24 having a lower forked portion attached to an axle 30 of a front wheel 32, a central portion pivotably attached to a front portion of the elongate frame 26, and a top portion carrying a steering member 35; a drive means 38 and rear driven wheel 40 attached to a rear portion of the frame 26; and, two laterally extended balance wheels 22 attached to and carried by a central portion of the frame 26. When the balance wheels 22 are positioned outwardly from the central portion of the frame 26 the golf cart 20 is maintained in an upright position.

Most preferably the balance wheels 22 may be extended from an inward storage position to an outward in use position and an upper central portion of the front fork 24 is collapsible for storage and transport. In a preferred embodiment of the invention the frame 26 comprises a platform 29. Each of the balance wheels 22 are attached to one end portion of an arm 34 having an opposite end portion which is hingably attached to a rear of the central portion of the platform 29 so that the balance wheels 22 may swing laterally outward from the platform 29 from a storage/transport position to an in-use position. Most preferably the balance wheels 22 are biased downwardly beneath the lateral arms 34 to facilitate contact maintenance with an uneven supporting surface 18.

To facilitate collapse of the golf cart 20 for transport in the trunk of an automobile (not shown) the upper central portion of the front fork 24 is hingably 52 collapsible so that the upper central portion of the front fork may be folded rearwardly. Most preferably the front fork 24 comprises a tube 25 and wherein the lock mechanism 42 comprises a sleeve 44 which slides downwardly over the hinged portion of the fork 24 to maintain the front fork 24 in an in-use position. The sleeve 24 may be biased towards its locked in-use position.

In the most preferred embodiment of the invention the central portion of the golf cart 20 platform 29 carries an upright member 46 which carries a golf bag support attachment 48. Interconnecting members 50 are positioned between an upper portion of the upright member and a wheel end portion of the lateral arms 24 strengthen and maintain the arms 34 in the outward in-use position. Most preferably a central portion of the interconnecting members 50 comprises a hinge 52. Opposite ends of the interconnecting members 50 are pivotably attached to the upright member 46 and the lateral arms 50 respectively. Then when the hinges 52 on the interconnecting members 50 are bent the arms 34 may be swung inwardly to the storage/transport position.

In the most preferred embodiment of the invention a seat 54, and an umbrella 56, both of which are carried by a top portion of the upright member 46 are provided. The steering member 35 comprises a steering bar 36 which carries a starter 58, a paddle throttle 60 and a hand brake lever 62 having a mechanism 64 to maintain it in a locked on position.

While the invention has been described with preferred specific embodiments thereof, it will be understood that this description is intended to illustrate and not to limit the scope of the invention, which is defined by the following claims.

What is claimed is:

1. A stable and lightweight collapsible golf cart comprising:
    an elongate frame having a front, rear, and central portion,
        a front fork having a lower forked portion attached to an axle of a front wheel, a central portion pivotably attached to a front portion of the elongate frame, and a top portion carrying a steering member;
        a drive means and rear driven wheel attached to a rear portion of the frame;
    an upright member carried by, and extending upwardly from the central portion of the frame;
        two laterally extendable balance wheels, each attached to an outer end portion of an outswinging arm having an inner end portion which is hingably attached to and carried by a central portion of the frame; and,
        two interconnecting members each positioned between an upper portion of the upright member and a wheel end portion of the lateral arms, said interconnecting members providing support for, and limiting the outward swing of the outswinging arms;
    wherein use the balance wheels are swung outwardly from a storage position along the central portion of the frame, to an outwardly extended in-use position to thereby maintain the golf cart in an upright position.

2. A golf cart as in claim 1 wherein an upper central portion of the front fork which is collapsible for storage and transport.

3. A golf cart as in claim 1 wherein the balance wheels are biased downwardly beneath the lateral arms to facilitate contact maintenance with an uneven supporting surface.

4. A golf cart as in claim 3 wherein the upper central portion of the front fork is hingably collapsible so that the upper central portion of the front fork may be folded rearwardly for transport.

5. A golf cart as in claim 4 wherein the front fork comprises a tube and wherein the lock mechanism comprises a sleeve which slides downwardly over the hinged portion of the fork to maintain the front fork in an in-use position.

6. A golf cart as in claim 3 wherein the central portion of the golf cart comprises a platform which carries the upright member and wherein the upright member carries a golf bag support attachment.

7. A golf cart as in claim 1 wherein a central portion of the interconnecting members comprises a hinge and wherein opposite ends of the interconnecting members are pivotably attached to the upright member and the lateral arms respectively.

8. A golf cart as in claim 6 further comprising a seat which is carried by a top portion of the upright member.

9. A golf cart as in claim 8 further comprising an umbrella which is carried by a top portion of the upright member.

10. A golf cart as in claim 8 wherein the steering member comprises a steering bar which carries a starter, a paddle throttle and a hand brake lever which has a locked on position.

* * * * *